United States Patent Office 2,855,412

Patented Oct. 7, 1958

2,855,412

16-IODOESTRONE ETHERS AND ESTERS

George P. Mueller, Park Ridge, Ill., assignor to G. D. Searle & Co., Chicago, Ill., a corporation of Delaware No Drawing. Application November 29, 1957
Serial No. 699,480

5 Claims. (Cl. 260—397.4)

The present invention relates to 16-iodoestrone, ethers and esters thereof. The compounds of the present invention can be represented by the structural formula

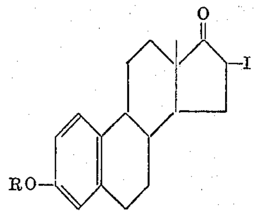

wherein R can be selected from the group of radicals consisting of hydrogen, lower alkyl and lower alkanoyl. Lower alkyl radicals which R can represent include methyl, ethyl, propyl, butyl, amyl, hexyl, heptyl, octyl, and branched-chain isomers of the foregoing. Among the lower alkanoyl radicals which R can represent are particularly the acyl radicals of carboxylic acids containing fewer than nine carbon atoms. Examples of such lower alkanoyl groups are acetyl, propionyl, butyryl, isobutyryl, valeryl, isovaleryl, hexanoyl, heptanoyl, and octanoyl.

Compounds of the present invention can be prepared by treating an ether or an ester of estrone enol (lower) alkanoate with an iodinating agent such as N-iodosuccinimide or iodine, destroying the excess iodinating agent and isolating the product. As a specific example, reaction of estrone enol acetate 3-methyl ether with N-iodosuccinimide in dioxane solution followed by destruction of excess iodine with sodium thiosulfate and isolation of the product affords 16-iodoestrone 3-methyl ether. The same compound is obtained by the use of iodine in carbon tetrachloride solution.

Suitable estrone 3-lower alkyl ethers as initial starting materials can be made by refluxing estrone with the desired alkyl iodide and an acid binding agent such as potassium carbonate in alcoholic solution, filtering, evaporating the filtrate to dryness, collecting and purifying the product. The resulting estrone 3-alkyl ether is then converted to an estrone enol acylate 3-alkyl ether. For example, the enol acetate can be made by distilling the estrone 3-alkyl ether with isopropenyl acetate and p-toluenesulfonic acid and isolating the product.

Suitable estrone enol diacylates can be prepared by heating estrone at about 150° for about 4 hours with the desired anlkanoyl anhydride and p-toluenesulfonic acid and recovering the product.

The addition of iodine to the enol acylate can lead to the formation of stereoisomeric products. Although both possible stereoisomers are formed, in actual practice it is found that one of the stereoisomers predominates, and that upon subjecting the crude reaction product to recrystallization, the crystalline product obtained consists substantially of a single stereoisomer. A determination of the stereochemical configuration of the predominant isomer is not necessary in the identification of the compounds or in employing the claimed compositions in their intended applications.

The compounds of the present invention have valuable pharmacological properties. They promote the deposition of calcium in the bony structures of the body as measured by changes in the bone density in the rat and they exhibit low estrogenic activity. Thus, 16-iodoestrone 3-methyl ether exhibits 6% of the anti-osteoporotic effect but only 0.26% of the estrogenic effect of diethylstilbestrol. The compounds of the invention thus exhibit an unexpected separation of biological effects, in the case of 16-iodoestrone 3-methyl ether producing a ratio of antiosteoporotic activity to estrogen activity of about 24 as compared to a ratio of 1 for diethylstilbestrol. In addition, they exhibit a lipodiatic effect, i. e., they cause a reduction in the serum ratio of cholesterol to phospholipids.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight and in parts by volume. Parts by weight bear the same relation to parts by volume as kilograms to liters.

*Example 1*

A mixture of 3.26 parts by weight of estrone enol acetate 3-methyl ether, 2.5 parts by weight of N-iodosuccinimide and 5 parts by volume of purified dioxane is placed in a reaction vessel, the air displaced with nitrogen, the reaction vessel closed and the contents dissolved by warming and stirring. After all has dissolved, the mixture is heated at 80° for 1.5 hours and then diluted with 20 parts by volume of methanol followed by a concentrated aqueous solution containing 3.3 parts by weight of potassium iodide whereupon the reaction mixture solidifies. An aqueous solution containing 2.48 parts by weight of sodium thiosulfate is added and the mixture cooled in ice with shaking. The reaction product is filtered, washed with water and dissolved in 250 parts by volume of boiling methanol. The methanolic solution is filtered, chilled, the crystalline residue filtered and crystallized once more from 150 parts by volume of methanol to yield irregular plates of 16-iodoestrone 3-methyl ether; melting point 161–166°; $[\alpha]_D=+89.7°$ (0.93% in chloroform).

*Example 2*

A mixture of 4.82 parts by weight of estrone 3-ethyl ether, 1.0 part by weight of p-toluenesulfonic acid monohydrate and 100 parts by volume of isopropenyl acetate is slowly distilled through a small column to half volume over a period of 24 hours. The mixture is cooled in ice, diluted with 200 parts by volume of ether and extracted three times with ice-cold sodium bicarbonate solution. The ether solution is dried over anhydrous magnesium sulfate, filtered and the solvent removed in vacuo.

The residue is dissolved in 25 parts by volume of dioxane and while maintained under a nitrogen atmosphere, treated with 5 parts by weight of N-iodosuccinimide and heated at 65° for 3.5 hours. The reaction mixture is cooled in ice, treated with 3.3 parts by weight of potassium iodide in water and then 5 parts by weight of sodium thiosulfate. The resulting mixture is diluted with 200 parts by volume of water and extracted successively with four 75 parts-by-volume portions of chloroform. The combined chloroform layers are washed with sodium thiosulfate solution, 3 times with water and dried over anhydrous magnesium sulfate. The mixture is filtered, the filtrate concentrated in vacuo to 20 parts by volume and then 250 parts by volume of methanol added, after which, the mixture is concentrated under slight vacuum to 125 parts by volume and allowed to stand overnight. The crystalline residue is filtered off, washed with methanol, dissolved in 275 parts by volume of boiling methanol, filtered and concentrated to 125 parts by volume and again crystallized to yield 16-iodoestrone 3-ethyl ether; melting point 156–160°; $[\alpha]_D=+91.5°$ (chloroform).

*Example 3*

13 parts by weight of estrone enol acetate 3-methyl ether is dissolved in 40 parts by volume of purified dioxane, 10 parts by weight of N-iodosuccinimide added, the reaction vessel swept with nitrogen, closed and heated at 75° for 3 hours. The mixture is chilled, and to it are added successively 6.6 parts by weight of potassium iodide in concentrated aqueous solution, 10 parts by weight of sodium thiosulfate in concentrated aqueous solution, and 250 parts by volume of water. The reaction mixture is extracted successively with three 100 parts-by-volume portions of chloroform, the chloroform extracts combined and washed with water, dried over sodium sulfate and concentrated to dryness in vacuo. The oily residue is dissolved in 500 parts by volume of boiling ether, concentrated to about 100 parts by volume and allowed to stand overnight. The mother liquor is then decanted from the resulting crystalline residue and evaporated to dryness. The crystalline residue from the mother liquor is triturated successively with 3 portions of 25 parts by volume of ethyl ether and then crystallized successively from (1) 75 parts by volume of ether, (2) 50 parts by volume of ether, (3) a mixture of 30 parts by volume of benzene and 150 parts by volume of petroleum ether, and (4) twice from 15 parts by volume of ethyl acetate to yield a 16-iodoestrone 3-methyl ether which is isomeric with the product of Example 1; melting point 162–165°; $[\alpha]_D=+178°$ (chloroform).

*Example 4*

Seven parts by weight of estrone enol diacetate is dissolved with warming in 20 parts by volume of dioxane and, under a nitrogen atmosphere, treated with 5 parts by weight of N-iodosuccinimide for 3 hours at 65°. The reaction mixture is chilled in ice, 3.3 parts by weight of potassium iodide in concentrated aqueous solution added followed by 5 parts by weight of sodium thiosulfate as an aqueous solution. The reaction mixture is diluted with 200 parts by volume of water and extracted successively with 4 portions of 75 parts by volume of chloroform. The chloroform extracts are combined, washed twice with water and dried over magnesium sulfate. After concentration to dryness, the oil remaining is dissolved in 100 parts by volume of ether followed by concentration to 30 parts by volume and allowed to stand for crystallization. The crystalline residue is dissolved in 35 parts by volume of methanol, chilled and the crystalline residue again crystallized from 30 parts by volume of methanol. The crystals thus obtained are dissolved in 10 parts by volume of benzene to which is added 25 parts by volume of cyclohexane, the mixture warmed and allowed to stand. The crystals thus obtained are filtered off, dissolved in 100 parts by volume of ether and concentrated to beginning crystallization. A final recrystallization from ether as described before yields 16-iodoestrone 3-acetate; melting point 142–143.6°; $[\alpha]_D=+82°$ (chloroform).

The mother liquors from all of the preceding crystallization steps are collected and evaporated to dryness. The residue is dissolved in 125 parts by volume of methanol to which is added 5 parts by volume of concentrated hydrochloric acid in 5 parts by volume of methanol, warmed to effect a clear solution and allowed to stand overnight. The crystalline material is crystallized twice from methanol to yield 16-iodoestrone; melting point 213–213.5° (dec.); $[\alpha]_D=+137°$ (chloroform).

*Example 5*

One part by weight of estrone enol acetate 3-methyl ether is dissolved in 25 parts by volume of carbon tetrachloride in which is suspended 2 parts by weight of anhydrous potassium carbonate. This solution is treated with 0.8 parts by weight of iodine dissolved in 25 parts by volume of carbon tetrachloride and allowed to stand at 30° for ½ hour. The mixture is diluted with 25 parts by volume of chloroform, washed with a concentrated solution of sodium bisulfite, then with water and dried over anhydrous magnesium sulfate. The solution is filtered, the filtrate evaporated in vacuo and the residue dissolved in hot methanol. After two days standing, the crystals separating at room temperature are collected and recrystallized successively from a mixture of benzene and petroleum ether and then from methanol. The crystals of 16-iodoestrone 3-methyl ether thus obtained melt at 161–167°; $[\alpha]_D=+90.5°$ (chloroform).

*Example 6*

A mixture of 18.2 parts by weight of estrone, 500 parts by volume of ethanol, 40 parts by weight of potassium carbonate and 100 parts by volume of normal propyl iodide is stirred under reflux for 4 hours, boiled down to one-half volume, cooled and filtered. The filtered solution is distilled to dryness and the residue dissolved in a mixture of water and methylene chloride. The organic layer is separated, washed with water, distilled to dryness and the residue recrystallized twice from methanol, yielding estrone 3-n-propyl ether; melting point 98–99°.

By substituting stoichiometric quantities of isopropyl iodide for the normal propyl iodide and otherwise following the procedure described above, estrone 3-isopropyl ether is obtained which after crystallization from methanol melts at 154–155°.

In the same manner by substituting stoichiometric quantities of n-butyl iodide, estrone 3-n-butyl ether is obtained, melting point 106–107°.

A mixture of 10 parts by weight of estrone n-propyl ether, 200 parts by volume of isopropenyl acetate and 1 part by weight of p-toluenesulfonic acid monohydrate is distilled slowly during 19 hours. The solution is chilled, diluted with cold ether and washed with an excess of cold aqueous sodium bicarbonate solution. After drying and filtering, the ethereal solution is distilled to dryness and the residue dissolved in petroleum ether for chromatography on 30 parts by weight of magnesium aluminum silicate (sold under the brand name "Florex"). After eluting with 500 parts by volume of petroleum ether, the combined eluates are concentrated to 50 parts by volume and the crystals separating on standing are collected to yield estrone enol acetate 3-n-propyl ether; melting point 98–99°.

5.3 parts by weight of estrone enol acetate 3-n-propyl ether is dissolved in 25 parts by volume of dioxane and, while maintained under a nitrogen atmosphere, treated with 5 parts by weight of N-iodosuccinimide and heated at 65° for 3½ hours. The reaction mixture is cooled in ice, treated with 3.3 parts by weight of potassium iodide in water and then with 5 parts by weight of sodium thiosulfate in aqueous solution. The resulting mixture is diluted with 200 parts by volume of water and extracted successively with four 75 parts-by-volume portions of chloroform. The combined chloroform layers are washed with sodium thiosulfate solution, three times with water and dried over anhydrous magnesium sulfate. The mixture is filtered, the filtrate concentrated to 20 parts by volume in vacuo and then 250 parts by volume of methanol added, after which, the mixture is concentrated under slight vacuum to 125 parts by volume and allowed to stand overnight. The crystalline residue is collected, washed with methanol, dissolved in 275 parts by volume of boiling methanol, filtered and concentrated to 125 parts by volume and again crystallized to yield 16-iodoestrone 3-n-propyl ether.

By substituting equivalent quantities of estrone 3-isopropyl ether or estrone 3-n-butyl ether and otherwise proceeding according to the preceding processes there are obtained 16-iodoestrone 3-isopropyl ether and 16-iodoestrone 3-n-butyl ether, respectively.

*Example 7*

A mixture of 3.5 parts by weight of estrone isobutyrate, 10.0 parts by weight of isobutyric anhydride and 0.5 parts by weight of p-toluenesulfonic acid monohydrate is slowly distilled to one-half volume over 4 hours. The reaction mixture is cooled and 100 parts by weight of crushed ice added. The mixture is extracted with 200 parts by volume of ether and the ether extract washed with ice cold sodium bicarbonate solution until neutral. The ether solution is dried over anhydrous magnesium sulfate, filtered and the solvent removed in vacuo.

The residue is dissolved in 30 parts by volume of dioxane and while maintained under a nitrogen atmosphere, treated with 5 parts by weight of N-iodosuccinimide and heated at 65° for 3½ hours. The reaction mixture is cooled in ice, treated with 3.3 parts by weight of potassium iodide in water and then with 5 parts by weight of sodium thiosulfate in aqueous solution. The resulting mixture is diluted with 200 parts by volume of water and extracted successively with four 75 parts-by-volume portions of chloroform. The combined chloroform extracts are washed with sodium thiosulfate solution, three times with water and dried over anhydrous magnesium sulfate. The mixture is filtered, the filtrate concentrated to 20 parts by volume in vacuo and then 250 parts by volume of methanol added after which, the mixture is concentrated under slight vacuum to 75 parts by volume and allowed to stand overnight. The crystalline residue is collected, washed with methanol and again crystallized from methanol to yield 16-iodestrone 3-isobutyrate.

By substituting 6 parts by weight of n-valeric anhydride and otherwise proceeding as described above, 16-iodoestrone 3-n-valerate is obtained.

What is claimed is:

1. 16-iodoestrone derivatives of the formula

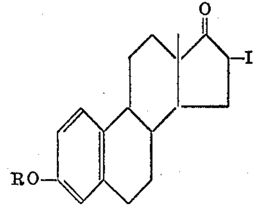

wherein R represents a radical selected from the group consisting of hydrogen, lower alkyl and lower alkanoyl.

2. 16-iodoestrone 3-methyl ether.

3. 16-iodoestrone 3-ethyl ether.

4. 16-iodoestrone.

5. 16-iodoestrone 3-acetate.

No references cited.